(12) United States Patent
Nagano et al.

(10) Patent No.: US 11,727,584 B2
(45) Date of Patent: Aug. 15, 2023

(54) SHAPE SUPPLEMENTATION DEVICE, SHAPE SUPPLEMENTATION LEARNING DEVICE, METHOD, AND PROGRAM

(71) Applicant: NIPPON TELEGRAPH AND TELEPHONE CORPORATION, Tokyo (JP)

(72) Inventors: Hidehisa Nagano, Tokyo (JP); Go Irie, Tokyo (JP); Seiya Ito, Kanagawa (JP); Kazuhiko Sumi, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 144 days.

(21) Appl. No.: 17/279,044

(22) PCT Filed: Sep. 12, 2019

(86) PCT No.: PCT/JP2019/035910
§ 371 (c)(1),
(2) Date: Mar. 23, 2021

(87) PCT Pub. No.: WO2020/066662
PCT Pub. Date: Apr. 2, 2020

(65) Prior Publication Data
US 2022/0005212 A1  Jan. 6, 2022

(30) Foreign Application Priority Data
Sep. 25, 2018 (JP) .................. 2018-179084

(51) Int. Cl.
*G06T 7/50* (2017.01)
*G06V 10/40* (2022.01)
(Continued)

(52) U.S. Cl.
CPC ............... *G06T 7/50* (2017.01); *G06F 18/24* (2023.01); *G06T 19/20* (2013.01); *G06V 10/40* (2022.01);
(Continued)

(58) Field of Classification Search
None
See application file for complete search history.

(56) References Cited

U.S. PATENT DOCUMENTS

2019/0147245 A1* 5/2019 Qi .................. G06V 10/82
382/103

OTHER PUBLICATIONS

Han et al. (2017) "High-Resolution Shape Completion Using Deep Neural Networks for Global Structure and Local Geometry Inference," International Conference on Computer Vision, Venice, Italy, Oct. 2017, 20 pages.
(Continued)

*Primary Examiner* — Yanna Wu (57) ABSTRACT

It is possible to receive a point cloud as input and perform shape completion with high accuracy. A shape completion unit inputs an input point cloud and a class identification feature output by a class identification unit to a generator that is learned in advance and generates a shape completion point cloud that is to complete a point cloud and is a set of three-dimensional points by receiving, as input, the point cloud and the class identification feature, gaining an integration result obtained by integrating a global feature that is a global feature based on local features extracted from respective points of the point cloud with the class identification feature, and convoluting the integration result, and outputs the shape completion point cloud that is to complete the input point cloud.

17 Claims, 6 Drawing Sheets

(51) Int. Cl.
*G06T 19/20* (2011.01)
*G06F 18/24* (2023.01)
(52) U.S. Cl.
CPC ............... *G06T 2207/10024* (2013.01); *G06T 2207/10028* (2013.01); *G06T 2207/20081* (2013.01); *G06T 2207/20084* (2013.01); *G06T 2207/20212* (2013.01); *G06T 2210/56* (2013.01); *G06T 2219/2021* (2013.01)

(56) References Cited

OTHER PUBLICATIONS

Ito et al. (2018) "Proposal of object recognition and shape complement network using point cloud as input," Information Processing Society of Japan Research Report, vol. 2018—CVIM-210,No. 54, pp. 1-4.

Seiya Ito (2017) "3D reconstruction considering semantic segmentation," Aoyama Gakuin University Graduate School of Science and Engineering Department of Science and Engineering Intelligent Information Course2017 Master's Research Paper, Feb. 28, 2018, 48 pages.

\* cited by examiner

SHAPE SUPPLEMENTATION DEVICE, SHAPE SUPPLEMENTATION LEARNING DEVICE, METHOD, AND PROGRAM

CROSS-REFERENCE TO RELATED APPLICATIONS

This application is a U.S. 371 Application of International Patent Application No. PCT/JP2019/035910, filed on 12 Sep. 2019, which application claims priority to and the benefit of JP Application No. 2018-179084, filed on 25 Sep. 2018, the disclosures of which are hereby incorporated herein by reference in their entireties.

TECHNICAL FIELD

The present invention relates to a shape completion device, shape completion learning device, method, and program, and more particularly to a shape completion device, shape completion learning device, method, and program for completing a set of three-dimensional points.

BACKGROUND ART

With recent development of three-dimensional measurement technology, RGB-D cameras and laser sensors capable of easy real-time measurement are prevalent. Data obtained through measurement by such sensors is often treated as a point cloud which is a set of three-dimensional points. Although a model in a complete shape needs to be reconstructed in order to treat point cloud data which is obtained as a result of measuring the real world in computer graphics or the like, a point cloud obtained through one measurement forms a part of a shape. It is thus necessary to perform measurement from various viewpoints and integrate pieces of point cloud data in order to acquire a complete shape of a target object. However, acquired data is susceptible to noise due to the material for the object, occlusions, and the like, and it is difficult to acquire a model in a complete shape through data integration. For this reason, shape completion through geometric and template-based approaches in the manners below has conventionally been proposed, and shape completion methods based on deep learning have recently been proposed.

In a geometric approach, a small gap can be filled by assuming a flat surface or a smooth volume for a local region. If there is a large missing portion, shape completion is performed by assuming a shape on the basis of an empirical rule for a particular shape category. A conventional method proposes a method that assumes a shape of an object as a set of primitive elements, such as a flat surface and a circular cylinder, and reconstructs a CAD model from an incomplete point cloud. Another conventional method optimizes a shape by taking into consideration an element-to-element geometric relationship, such as orientation or placement, for locally fit primitive elements. In addition, a method that detects a symmetry from an incomplete point cloud and completes a shape on the basis of a plurality of symmetries is proposed.

A template-based approach reconstructs an input shape using a deformable template or a nearest neighbor. A conventional method takes out a most similar shape from a database, uses the most similar shape as a template, and deforms the template to fit input data. These methods, however, need a dialog with a user in the case of a complicated input. If there is no template close to an input, the methods may fail in shape completion.

To cope with the above-described problem, a conventional method proposes a method that performs shape reconstruction from partial scan data by focusing attention on a structure and a relationship between parts, finding best part candidates from a database, and solving a combinatorial optimization problem.

Shape completion methods based on deep learning have recently been proposed. A conventional method learns a probability distribution over binary variables representing voxel occupancy in a three-dimensional grid on the basis of convolutional deep beliefnetworks (CDBNs) and completes a shape. Another conventional method combines CDBNs and Markov random fields to formulate shape completion as a maximum a posteriori inference problem. A certain conventional method learns an encoder-decoder network in an end-to-end manner to perform shape completion. Due to high computational cost of three-dimensional convolutions, these conventional methods voxelize an input in a coarse grid. There is also available a conventional method that proposes, for a voxelization method, a three-dimensional encoder-predictor network (EPN) to infer a complete shape on a coarse grid and reconstructs a detailed shape through nearest-neighbor-based volumetric patch synthesis. For example, a conventional technique according to Non-Patent Literature 1 further learns a local EPN which infers a global shape structure and a patch-level surface.

CITATION LIST

Non-Patent Literature

Non-Patent Literature 1: X. Han, Z. Li, H. Huang, E. Kalogerakis, and Y. Yu, "High-Resolution Shape Completion Using Deep Neural Networks for Global Structure and Local Geometry Inference," International Conference on Computer Vision, 2017

SUMMARY OF THE INVENTION

Technical Problem

Since the method described in Non-Patent Literature 1 involves the high computational cost of three-dimensional convolutions, the method voxelizes an input in a coarse grid. The method thus suffers from the problem of the incapability of inputting a point group itself of a point cloud and effectively utilizing information of each point of the point group.

The present invention has been made in view of the above-described circumstances, and it is an object of the present invention to provide a shape completion device, method, and program capable of receiving a point cloud as input and performing shape completion with high accuracy.

It is also an object to provide a shape completion learning device, method, and program capable of learning a generator for receiving a point cloud as input and performing shape completion with high accuracy.

Means for Solving the Problem

To attain the above-described object, a shape completion device according to a first invention is a shape completion device for completing a point cloud that is a measurement result obtained by measuring a set of three-dimensional points on an object and is configured to include a class identification unit that inputs an input point cloud to an identifier that is learned in advance and identifies a class of the object and outputs a class identification feature that is calculated at the time of identification of a class of an object represented by the input point cloud, and a shape completion unit that inputs the input point cloud and the class identification feature output by the class identification unit to a generator that is learned in advance and generates a shape completion point cloud that is to complete a point cloud and is a set of three-dimensional points by receiving, as input, the point cloud and the class identification feature, gaining an integration result obtained by integrating a global feature that is a global feature based on local features extracted from respective points of the point cloud with the class identification feature, and convoluting the integration result, and outputs the shape completion point cloud that is to complete the input point cloud.

A shape completion learning device according to a second invention is a shape completion learning device for learning a generator that generates a shape completion point cloud that is to complete a point cloud that is a measurement result obtained by measuring a set of three-dimensional points on an object and is a set of three-dimensional points and is configured to include a learning unit that, on the basis of learning data including an input point cloud that is a set of sparse three-dimensional points representing a part of a shape of the object and a teacher point cloud that is to complete the input point cloud, inputs the input point cloud to an identifier that is learned in advance and identifies a class of the object and outputs a class identification feature that is calculated at the time of identification of a class of an object represented by the input point cloud, and optimizes, for the generator that generates the shape completion point cloud that is to complete a point cloud by receiving, as input, the point cloud and the class identification feature, gaining an integration result obtained by integrating a global feature that is a global feature based on local features extracted from respective points of the point cloud with the class identification feature, and convoluting the integration result and a determiner that receives, as input, the point cloud, the shape completion point cloud, and the class identification feature and determines whether a set of three-dimensional points, into which the point cloud and the shape completion point cloud are combined, is a true point cloud, a parameter for the generator and a parameter for the determiner so as to optimize a loss function that is represented using a determination result from the determiner for a set of three-dimensional points, into which the input point cloud and the teacher point cloud are combined, a determination result from the determiner for a set of three-dimensional points, into which the input point cloud and the shape completion point cloud generated by the generator are combined, and a distance between the shape completion point cloud generated by the generator and the teacher point cloud.

A shape completion method according to a third invention is a shape completion method in a shape completion device for completing a point cloud that is a measurement result obtained by measuring a set of three-dimensional points on an object and includes and executes a step by a class identification unit of inputting an input point cloud to an identifier that is learned in advance and identifies a class of the object and outputting a class identification feature that is calculated at the time of identification of a class of an object represented by the input point cloud, and a step by a shape completion unit of inputting the input point cloud and the class identification feature output by the class identification unit to a generator that is learned in advance and generates a shape completion point cloud that is to complete a point cloud and is a set of three-dimensional points by receiving, as input, the point cloud and the class identification feature, gaining an integration result obtained by integrating a global feature that is a global feature based on local features extracted from respective points of the point cloud with the class identification feature, and convoluting the integration result and outputting the shape completion point cloud that is to complete the input point cloud.

A shape completion learning method according to a fourth invention is a shape completion learning device for learning a generator that generates a shape completion point cloud that is to complete a point cloud that is a measurement result obtained by measuring a set of three-dimensional points on an object and is a set of three-dimensional points and includes and executes a step by a learning unit of, on the basis of learning data including an input point cloud that is a set of sparse three-dimensional points representing a part of a shape of the object and a teacher point cloud that is to complete the input point cloud, inputting the input point cloud to an identifier that is learned in advance and identifies a class of the object and outputting a class identification feature that is calculated at the time of identification of a class of an object represented by the input point cloud, and optimizing, for the generator that generates the shape completion point cloud that is to complete a point cloud by receiving, as input, the point cloud and the class identification feature, gaining an integration result obtained by integrating a global feature that is a global feature based on local features extracted from respective points of the point cloud with the class identification feature, and convoluting the integration result and a determiner that receives, as input, the point cloud, the shape completion point cloud, and the class identification feature and determines whether a set of three-dimensional points, into which the point cloud and the shape completion point cloud are combined, is a true point cloud, a parameter for the generator and a parameter for the determiner so as to optimize a loss function that is represented using a determination result from the determiner for a set of three-dimensional points, into which the input point cloud and the teacher point cloud are combined, a determination result from the determiner for a set of three-dimensional points, into which the input point cloud and the shape completion point cloud generated by the generator are combined, and a distance between the shape completion point cloud generated by the generator and the teacher point cloud.

A program according to a fifth invention is a program for functioning as the units of the shape completion device according to the first invention.

A program according to a sixth invention is a program for functioning as the units of the shape completion device according to the second invention.

Effects of the Invention

A shape completion device, method, and program according to the present invention achieve the effect of receiving a point cloud as input and performing shape completion with high accuracy.

A shape completion learning device, method, and program according to the present invention achieve the effect of learning a generator that receives a point cloud as input and performs shape completion with high accuracy.

DESCRIPTION OF EMBODIMENTS

An embodiment of the present invention will be described in detail below with reference to the drawings.

First, the outline of the embodiment of the present invention will be described.

There are many cases where a point cloud of an object which is observed in the real world can be obtained only from a partial shape, and performing class identification and shape completion of an object is important to implementation of various applications. Like the problems of the above-described conventional techniques, a convolutional neural network which is nowadays the mainstream needs to transform an input into a voxel or a depth image due to its nature in order to treat three-dimensional data. However, since this discretizes original three-dimensional information or maps the original three-dimensional information in a two-dimensional manner, information missing may occur.

Under the above-described circumstances, the embodiment of the present invention proposes a method using a neural network called PCNet that simultaneously performs class identification and shape completion on the basis of a point cloud. The method extracts a global feature from local features of a point cloud, performs class identification on the basis of the global feature, and performs shape completion using the global feature.

Figure 1:
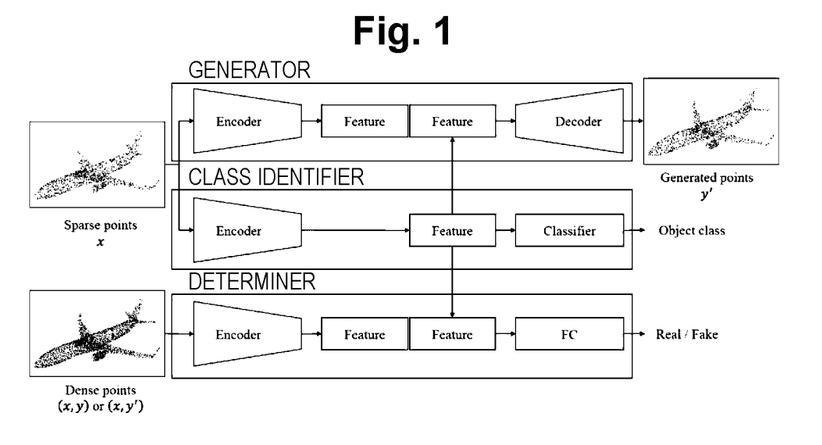
FIG. 1 is a diagram showing one example of a network structure of PCNet.

A network structure of PCNet used in the present embodiment is shown in FIG. 1.

Let x be an input point cloud which is a set of sparse three-dimensional points serving as input and representing a shape of an object; y', a shape completion point cloud which is a set of three-dimensional points which are to complete an input shape; and y, a teacher point cloud which serves as a teacher of shape completion. The PCNet used in the present embodiment is composed of a class identifier, a generator, and a determiner. The class identifier performs object recognition on the input point cloud x. The generator generates the shape completion point cloud y'. The determiner identifies whether a set (x,y') with the input point cloud and the completion point cloud or a set (x,y) with the input point cloud and the teacher point cloud is real (true) or fake (false). In the present embodiment, PointNet is used as the class identifier (see Reference Literature 1).

[Reference Literature 1] C. R. Qi, H. Su, K. Mo, and L. J. Guibas, "PointNet: Deep Learning on Point Sets for 3D Classication and Segmentation," Proc. Computer Vision and Pattern Recognition, 2017

Figure 2:
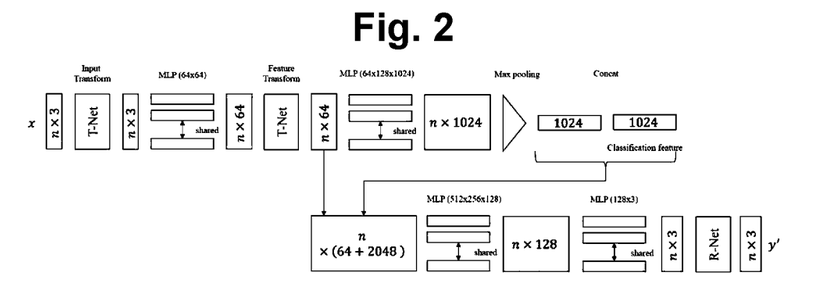
FIG. 2 is a diagram showing one example of details of a network structure of a generator.
Figure 3:
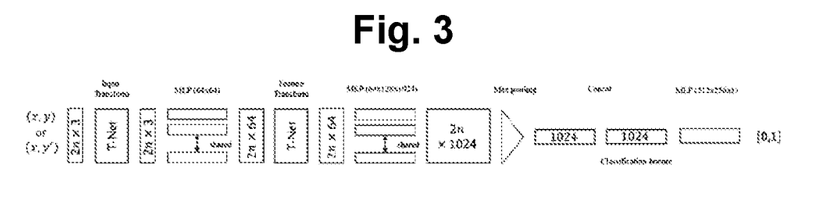
FIG. 3 is a diagram showing one example of details of a network structure of a determiner.

Details of a network structure of the generator are shown in FIG. 2, and details of a network structure of the determiner are shown in FIG. 3.

As shown in FIG. 2, the generator first extracts a local feature from each point of the input point cloud. A portion from Input Transform to MLP (64×128×1024) in FIG. 2 corresponds to Encoder in FIG. 1. The generator then performs max pooling on each dimension of all of local features to obtain a global feature based on the local features. In the PCNet, the global feature extracted from the input point cloud is combined with a class identification feature which is calculated at the time of class identification by the class identifier. In the PCNet, a feature associated with an object shape can be explicitly given to the input point cloud through the combination with the class identification feature.

As for the generator, an intermediate local feature extracted from each point is combined with the global feature, and convolution (MLP) is performed to obtain a three-dimensional vector. At a last layer, a positional deviation due to rotation and parallel translation between the input point cloud and a generated point cloud is reduced by R-Net. The R-Net extends T-Net in the PointNet (Reference Literature 1) and is made to learn not only a rotation matrix but also a parallel translation vector.

The set (x,y') of three-dimensional points that is a combination of the input point cloud and the teacher point cloud and the set (x,y') of three-dimensional points that is a combination of the input point cloud and the generated shape completion point cloud are each input as input to the determiner. Max pooling is then performed to obtain a global feature, and a process leading up to combination of the global feature with the class identification feature is performed in the same manner as in the generator. The determiner performs convolution on the combined global feature and outputs a value on the interval [0,1] using a sigmoid function as an activation function for the last layer.

The network configuration of the PCNet used in the present embodiment has been described above.

In the present embodiment, parameters are learned using a loss function for the network configuration of the above-described PCNet.

A loss function used to learn a parameter will be described below.

Let $G(x;\theta_g)$ be the generator; and $D(x,y;\theta_g)$, the determiner. As for $G(x;\theta_g)$, the parameter $\theta_g$ is learned such that a probability distribution p(x) for generation of a shape completion point cloud approximates to the observed point cloud x. As for $D(x,y;\theta_d)$, the parameter $\theta_d$ is learned such that the probability of correctly determining truth or falsity is high even if the generated shape completion point cloud y' approximates to the teacher point cloud y. Learning of D is performed such that log D(x,y) is maximized, and learning of G is performed such that log(1-D(x,G(x)) is minimized. Letting V(D,G) be a loss function which is a compilation of the above, the loss function is represented by Formula (1) below.

[Formula 1]

$$V(D, G) = \mathbb{E}_{(x,y) \sim p_{(x,y)}}[\log D(x, y)] + \mathbb{E}_{x \sim p_{(x)}}[\log(1 - D(x, G(x)))] \quad (1)$$

In the present embodiment, a loss function R which causes a generated point group to reproduce a shape of an object is designed in addition to V(D,G). First, stable matching is performed on the input point cloud and the teacher point cloud for shape completion to form a one-to-one point pair. The Gale-Shapley algorithm is used for the stable matching (see Reference Literature 2).

[Reference Literature 2] D. Gale and L. S. Shapley, "College Admissions and the Stability of Marriage," The American Mathematical Monthly, Vol. 69, No. 1, pp. 9{15, 1962).

Stable matching is based on preference lists, and pairs to be obtained are optimized such that there are no pairs which prefer each other to their current partners. In the present embodiment, a preference list is created in ascending order of Euclidean distance, and pairs are formed so as to reduce distances between points of the input point cloud and points of the teacher point cloud. The generator is learned such that a shape completion point which is generated from each point of the input point cloud approximates to a teacher point. Assume here that the loss function R is given by Formula (2) below.

[Formula 2]

$$R(G) = \sum_i \|y'(i) - y(i)\|_2 \quad (2)$$

A loss function to be finally optimized is given by Formula (3) below, where λ is a weighting factor.

[Formula 3]

$$\mathcal{L} = \min_G \left( \max_D (V(D, G) + \lambda R(G)) \right) \quad (3)$$

Configurations and operations of a shape completion learning device and a shape completion device will be described below on the basis of the network configuration and the loss functions described above.

<Configuration of Shape Completion Learning Device According to Embodiment of Present Invention>

Figure 4:
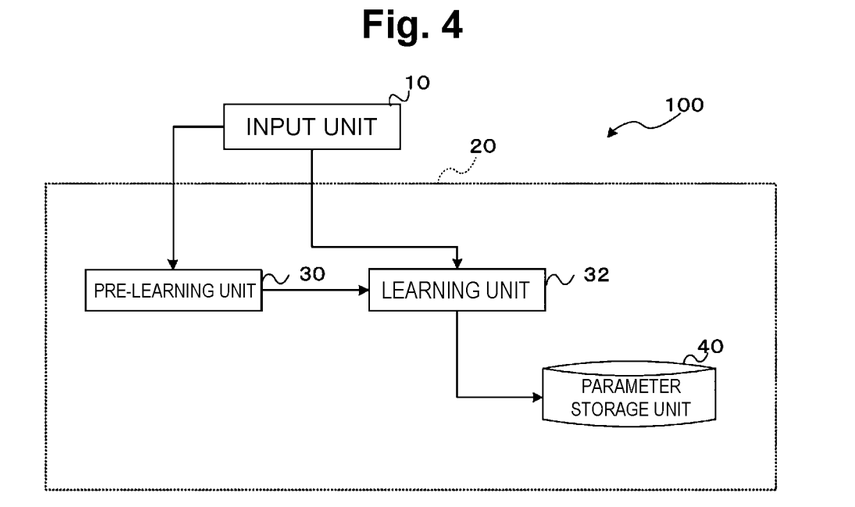
FIG. 4 is a block diagram showing a configuration of a shape completion learning device according to an embodiment of the present invention.

A configuration of a shape completion learning device according to the embodiment of the present invention will be described. As shown in FIG. 4, a shape completion learning device 100 according to the embodiment of the present invention can be constructed from a computer which includes a CPU, a RAM, and a ROM storing a program for execution of a shape completion learning processing routine (to be described later) and various types of data. The shape completion learning device 100 functionally includes an input unit 10 and an arithmetic unit 20, as shown in FIG. 4.

The input unit 10 accepts learning data including an input point cloud which is a set of sparse three-dimensional points representing a part of an object, a teacher point cloud which is to complete the input point cloud, and a label indicating a class of the object.

The arithmetic unit 20 is configured to include a pre-learning unit 30, a learning unit 32, and a parameter storage unit 40.

In the present embodiment, network parameters for the PCNet described above are learned.

The pre-learning unit 30 learns a class identifier which identifies a class of an object on the basis of the learning data including the input point cloud and the teacher point cloud.

The class identifier is the above-described class identifier and is intended to learn a weight using a known learning method of the PointNet. A parameter for the learned class identifier is stored in the parameter storage unit 40. Note that a class identifier learned by an external device may be used instead of providing the pre-learning unit 30 in the shape completion learning device 100. Although the learning data according to the present embodiment is assumed to be learning data to be used in the learning unit 32, learning data different from the learning data to be used in the learning unit 32 may be used for the learning of the class identifier.

The learning unit 32 optimizes a parameter for a generator and a parameter for a determiner on the basis of the learning data including the input point cloud and the teacher point cloud such that a loss function indicated by Formula (3) above is optimized and stores the parameters in the parameter storage unit 40.

The learning unit 32 inputs the input point cloud to the class identifier learned by the pre-learning unit 30, and a class identification feature is output to the generator and to the determiner.

The generator is the above-described generator. The generator receives, as input, a point cloud and a class identification feature, gains an integration result obtained by integrating a global feature serving as a global feature based on local features extracted from points of the point cloud with the class identification feature, and convoluting the integration result, thereby generating a shape completion point cloud which is to complete the point cloud.

The determiner is the above-described determiner. The determiner receives, as input, a point cloud, a shape completion point cloud, and a class identification feature and determines whether a set of three-dimensional points obtained by combining together the point cloud and the shape completion point cloud is a true point cloud.

The parameter optimization is performed on the basis of the loss function indicated by Formula (3) above using stochastic gradient descent. The loss function is represented using a determination result from the determiner and a distance between a shape completion point cloud y' generated by the generator and a teacher point cloud y. The determination result is a result, having a value on the interval [0,1], of determination by the determiner about a set (x,y) of three-dimensional points obtained by combining together an input point cloud and the teacher point cloud and a result, having a value on the interval [0,1], of determination by the determiner about a set (x,y') of three-dimensional points obtained by combining together the input point cloud and the generated shape completion point cloud. As for the determiner, learning is performed such that the probability of correctly determining truth or falsity for the set (x,y) of three-dimensional points and the set (x,y') of three-dimensional points is high (i.e., such that log D(x,y) is maximized). As for the generator, learning is performed such that the generated shape completion point cloud is determined as true by the determiner (i.e., such that log(1-D(x,G(x))) is minimized).

The distance between the shape completion point cloud y' and the teacher point cloud y is determined using a result of point association i between the input point cloud x and the teacher point cloud y. As indicated by R(G) in Formula (2) above, the distance between the shape completion point cloud y' and the teacher point cloud y is represented as the sum of distances between points $y_i'$ of the shape completion point cloud and points $y_i$ of the teacher point cloud corresponding to the point association i. As for the generator, learning is performed such that the sum of the distances is minimized.

The learning unit 32 optimizes the parameter for the generator and the parameter for the determiner on the basis of the above-described loss function.

<Configuration of Shape Completion Device According to Embodiment of Present Invention>

Figure 5:
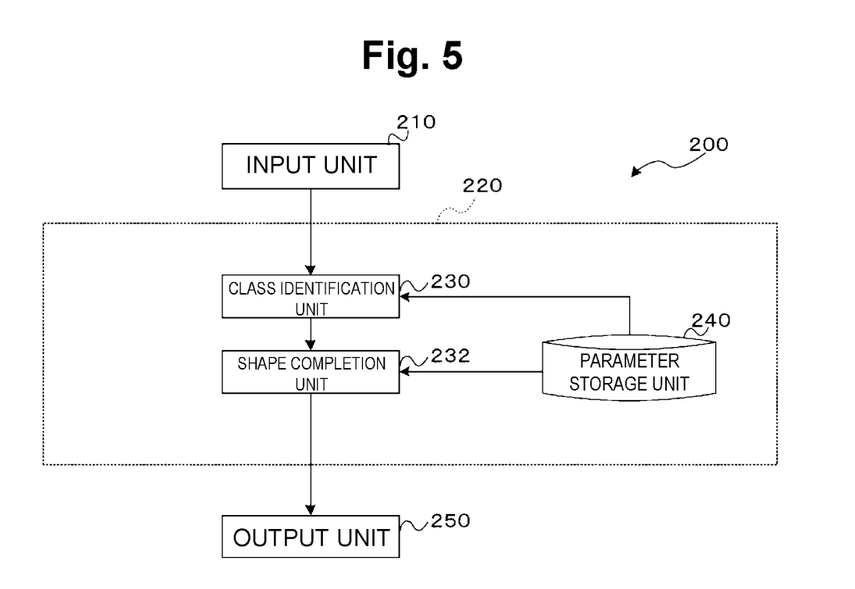
FIG. 5 is a block diagram showing a configuration of a shape completion device according to the embodiment of the present invention.

A configuration of a shape completion device according to the embodiment of the present invention will be described. As shown in FIG. 5, a shape completion device 200 according to the embodiment of the present invention can be constructed from a computer which includes a CPU, a RAM, and a ROM storing a program for execution of a shape completion processing routine (to be described later) and various types of data. The shape completion device 200 functionally includes an input unit 210, an arithmetic unit 220, and an output unit 250, as shown in FIG. 5.

The input unit 210 accepts an input point cloud which is a target of shape completion.

The arithmetic unit 220 is configured to include a class identification unit 230, a shape completion unit 232, and a parameter storage unit 240.

A parameter for a class identifier and a parameter for a generator which are learned by the shape completion learning device 100 are stored in the parameter storage unit 240.

The learned class identifier receives, as input, a point cloud and identifies a class of an object using the parameter for the identifier of the parameter storage unit 240. The class identifier calculates a class identification feature at the time of the class identification. The learned generator receives, as input, a point cloud and a class identification feature, and gains an integration result obtained by integrating a global feature serving as a global feature based on local features extracted from points of the point cloud with the class identification feature, using the parameter for the generator in the parameter storage unit 240. The class identifier then generates a shape completion point cloud which is a set of three-dimensional points serving to complete the point cloud by convoluting the integration result.

The class identification unit 230 inputs the input point cloud accepted by the input unit 10 to the learned class identifier and outputs a class identification feature to the shape completion unit 232. The class identification unit 230 also outputs a result of identifying a class of an object by the class identifier to the output unit 250.

The shape completion unit 232 inputs the input point cloud accepted by the input unit 10 and the class identification feature output by the class identification unit 230 to the learned generator and outputs a shape completion point cloud which is to complete the input point cloud to the output unit 250.

<Operation of Shape Completion Learning Device According to Embodiment of Present Invention>

Operation of the shape completion learning device 100 according to the embodiment of the present invention will be described. The shape completion learning device 100 executes a shape completion learning processing routine shown in FIG. 6.

Figure 6:
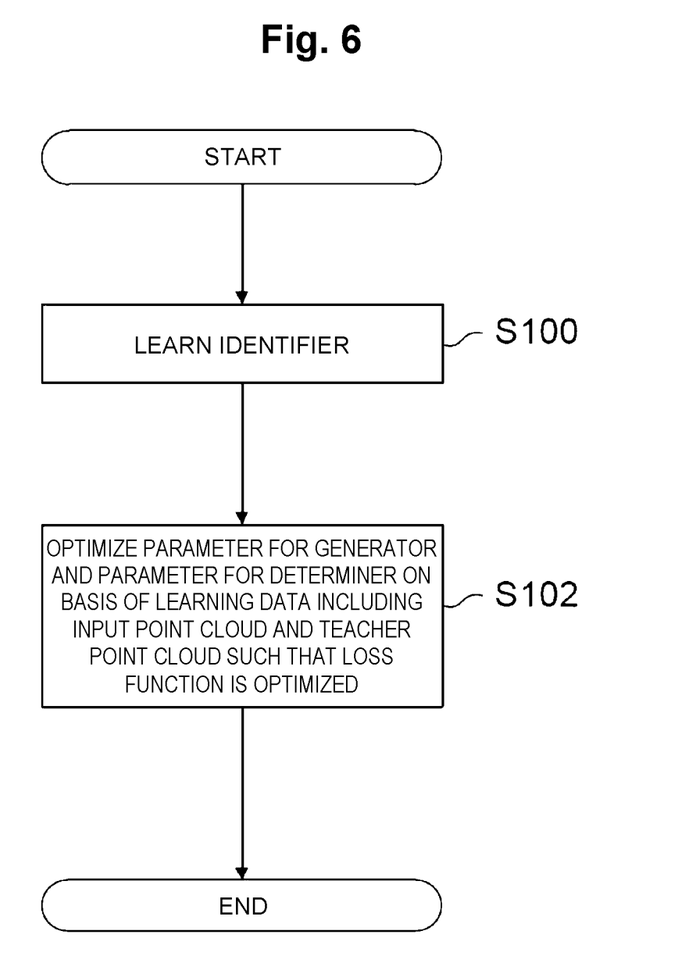
FIG. 6 is a flowchart showing a shape completion learning processing routine in the shape completion learning device according to the embodiment of the present invention.

First, in step S100, the pre-learning unit 30 learns the class identifier that identifies a class of an object on the basis of an input point cloud and a label indicating the class of the object included in learning data.

Next, in step S102, a parameter for the generator and a parameter for the determiner are optimized on the basis of the input point cloud and a teacher point cloud included in the learning data such that the loss function indicated by Formula (3) above is optimized and are stored in the parameter storage unit 40.

As for the determiner, learning is performed such that the probability of correctly determining truth or falsity for a set (x,y) of three-dimensional points and a set (x,y') of three-dimensional points is high (i.e., such that log D(x,y) is maximized). As for the generator, learning is performed such that the sum of distances to the teacher point cloud is minimized and such that a generated shape completion point cloud is determined as true by the determiner (i.e., such that log(1-D(x,G(x))) is minimized).

As has been described above, a shape completion learning device according to the embodiment of the present invention can receive a point cloud as input and learn a network for high-accuracy shape completion.

<Operation of Shape Completion Device According to Embodiment of Present Invention>

Operation of the shape completion device 200 according to the embodiment of the present invention will be described. The shape completion device 200 executes a shape completion processing routine shown in FIG. 7.

Figure 7:
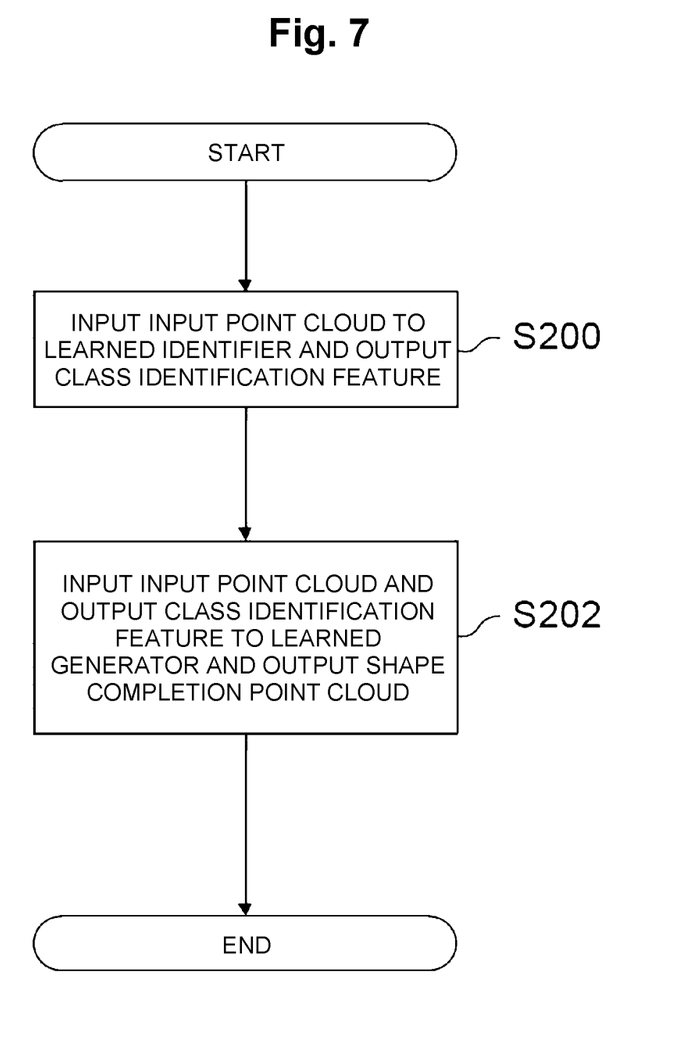
FIG. 7 is a flowchart showing a shape completion processing routine in the shape completion device according to the embodiment of the present invention.

First, in step S200, the class identification unit 230 inputs an input point cloud accepted by the input unit 10 to the learned class identifier and outputs a class identification feature to the shape completion unit 232, and outputs a result of identifying a class of an object by the class identifier to the output unit 250.

Next, in step S202, the shape completion unit 232 inputs the input point cloud accepted by the input unit 10 and the class identification feature output in step S200 to the learned generator and outputs a shape completion point cloud which is to complete the input point cloud to the output unit 250.

As has been described above, a shape completion device according to the embodiment of the present invention can receive a point cloud as input and perform shape completion with high accuracy.

[Experimental Result]

An experimental result obtained using a method according to the embodiment of the present invention will be described. An experiment is performed using ModelNet40 in order to evaluate performance of a proposed method. ModelNet40 refers to CAD models of a single object for 40 classes, and the number of vertices is standardized at 2048 in the PointNet. In this experiment, a point cloud composed of 2048 points was divided into an input point cloud and a teacher point cloud for shape completion such that the point clouds each had 1024 points. Random sampling was used for the data division, one model was sampled ten times, and data extension was performed. In PCNet, a class identifier is first learned to fix a parameter. A generator and a determiner, exclusive of the class identifier, are alternately optimized, and the identifier alone is finally optimized. Note that stochastic gradient descent was used to optimize a loss function, a learning rate was set at $10^{-10}$, and that a weighting factor λ of the loss function was set at 0.1.

Figure 8:
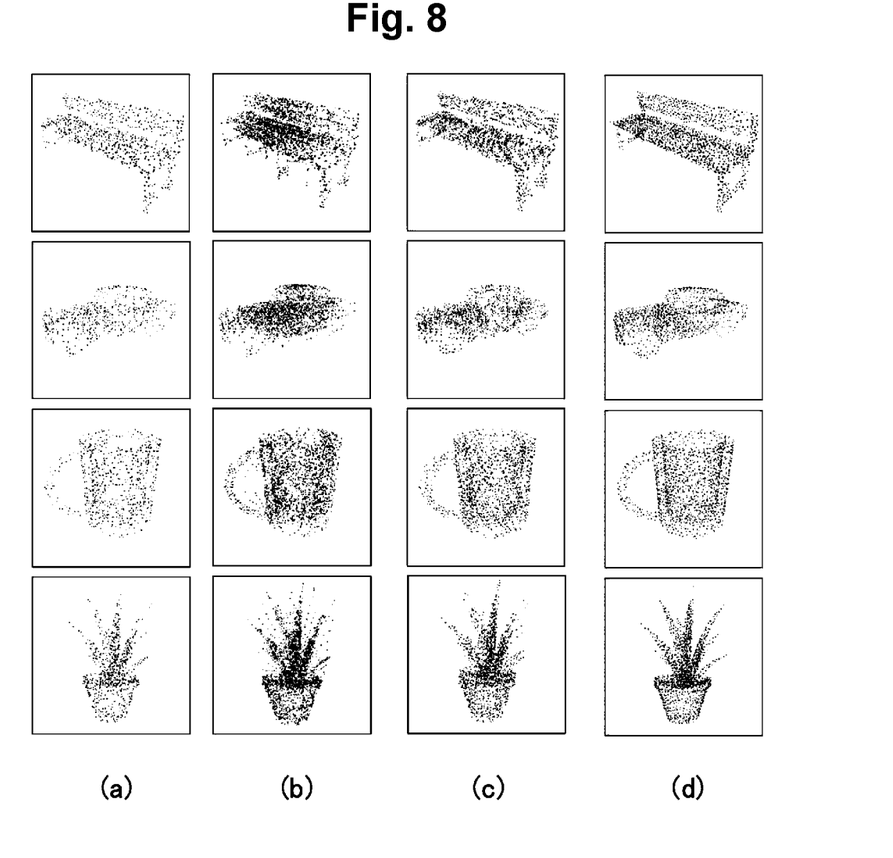
FIG. 8 is a chart showing a shape completion comparison result in an experimental result.
Figure 9:
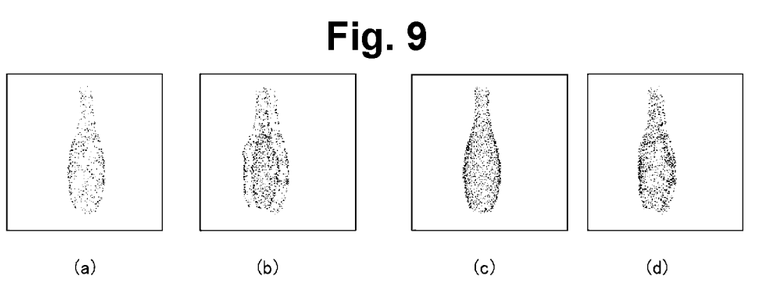
FIG. 9 is a chart showing a result of an effect of R-Net in an experimental result.

A shape completion comparison result is shown in FIG. 8. Of FIG. 8, part (a) shows an input point cloud, part (b) shows a method for supplying a point to a barycenter of each triangular mesh obtained by Delaunay division, part (c) shows a proposed method according to the present embodiment, and part (d) shows a teacher point cloud for shape completion. Parts (b) to (d) each have the added input point cloud. In shape completion using Delaunay division, a point cloud could be made dense while an entire shape was maintained, but resultantly the entire point cloud was enveloped in noise. In contrast, shape completion by the proposed method that added an object class identification feature to point cloud generation by a generator generated a completion point cloud along the input point cloud without noise. FIG. 9 shows a result of verifying an effect of the R-Net, part (a) shows an input, part (b) shows a case with the R-Net, part (c) shows a case without the R-Net, and part (d) shows a correct answer. As shown in FIG. 9, the R-Net learns a transformation matrix which brings a shape completion point cloud close to a teacher point cloud and reduces a positional deviation as compared to the case without the R-Net.

The above is a description of the experimental result.

Note that the present invention is not limited to the above-described embodiment and that various modifications and applications can be made without departing from the spirit of the invention.

REFERENCE SIGNS LIST 10, 210 Input unit
20, 220 Arithmetic unit
30 Pre-learning unit
32 Learning unit
40 Parameter storage unit
100 Shape completion learning device
200 Shape completion device
230 Class identification unit
232 Shape completion unit
240 Parameter storage unit
250 Output unit

The invention claimed is:

1. A shape completion device comprising a processor configured to execute a method comprising:
inputting an input point cloud to a learning model, wherein the input point cloud includes a plurality of input points, wherein the learning model is trained using learning data, the learning data includes a learning input point cloud and a teacher point cloud, the learning input point cloud includes a set of sparse three-dimensional points representing a part of a shape of an object, and the teacher point cloud completes an output shape based on the learning input point cloud;
determining, based on the input point cloud, a class identification feature of a class, wherein the class is associated with the object; and
generating, based on the input point cloud and the class identification feature, a shape completion point cloud,
wherein the generating the shape completion point cloud further comprises:
determining a combination of parameters including a parameter associated with the generating the shape completion point cloud and a parameter associated with determining whether the set of sparse three-dimensional points is a true point cloud, wherein the determining the combination of parameters further comprises optimizing a loss function, and the loss function is based at least on:
a determination result from the determining whether a set of three-dimensional points that includes the input point cloud and the teacher point cloud are combined is a true point cloud,
a determination result from the determining whether a set of three-dimensional points that includes the input point cloud and the shape completion point cloud is a true point cloud, and
a distance between the shape completion point cloud and the teacher point cloud, and
wherein the shape completion point cloud includes a set of three-dimensional points, wherein the generating the shape completion point cloud further includes obtaining an integration result, and wherein the integration result is obtained by steps including:
determining, based on local features associated with respective points of the input point cloud, a global feature associated with the input point cloud,
integrating the global feature with the class identification feature, and
convoluting the integration result to determine a missing portion of the object and to generate the shape completion point cloud associated with the input point cloud.

2. The shape completion device according to claim 1, wherein the distance between the shape completion point cloud and the teacher point cloud includes a sum of distances between points of the shape completion point cloud and points of the teacher point cloud that correspond to each other, and wherein the sum is determined using a result of point association between the input point cloud and the teacher point cloud.

3. The shape completion device according to claim 1, wherein the identifying the class of the object uses a first network, and wherein the generating the shape completion point cloud uses a second network, and wherein the first network and the second network are distinct.

4. The shape completion device according to claim 1, the processor further configured to execute a method comprising:
receiving sensor data from one or more sensors, wherein the sensor data includes a cloud point as measured data.

5. The shape completion device according to claim 1, wherein the one or more sensors include one or more of RGB-D camera or a laser sensor.

6. The shape completion device according to claim 1, wherein the loss function includes a stable matching based on Gale-Shapley.

7. A shape completion method for completing a point cloud based on a set of three-dimensional points indicating an object, comprising:
inputting an input point cloud to a learning model, wherein the input point cloud includes a plurality of input points, the learning model is trained using learning data, the learning data includes a learning input point cloud and a teacher point cloud, the learning input point cloud includes a set of sparse three-dimensional points representing a part of a shape of an object, and the teacher point cloud completes an output shape based on the learning input point cloud;
determining, based on the input point cloud, a class identification feature of a class, wherein the class is associated with the object; and
generating, based on the input point cloud and the class identification feature, a shape completion point cloud,
wherein the generating the shape completion point cloud further comprises:
determining a combination of parameters including a parameter associated with the generating the shape completion point cloud and a parameter associated with determining whether the set of sparse three-dimensional points is a true point cloud, wherein the determining the combination of parameters further comprises optimizing a loss function, and the loss function is based at least on:
a determination result from the determining whether a set of three-dimensional points that includes the input point cloud and the teacher point cloud are combined is a true point cloud,
a determination result from the determining whether a set of three-dimensional points that includes the input point cloud and the shape completion point cloud is a true point cloud, and
a distance between the shape completion point cloud and the teacher point cloud, and
wherein the shape completion point cloud includes the set of three-dimensional points, wherein the generating the shape completion point cloud further includes obtaining an integration result, and wherein the integration result is obtained by steps including:
determining, based on local features associated with respective points of the input point cloud, a global feature associated with the input point cloud,
integrating the global feature with the class identification feature, and
convoluting the integration result to determine a missing portion of the object and to generate the shape completion point cloud associated with the input point cloud.

8. The shape completion method according to claim 7, wherein the identifying the class of the object uses a first network, and wherein the generating the shape completion point cloud uses a second network, and wherein the first network and the second network are distinct.

9. The shape completion method according to claim 7, the method further comprising:
receiving sensor data from one or more sensors, wherein the sensor data includes a cloud point as measured data.

10. The shape completion method according to claim 7, wherein the one or more sensors include one or more of RGB-D camera or a laser sensor.

11. The shape completion method according to claim 7, wherein the loss function includes a stable matching based on Gale-Shapley.

12. A system for performing completion of a point cloud that is a measurement result obtained by measuring a set of three-dimensional points on an object, the system comprises:
a processor; and
a memory storing computer-executable program instructions that when executed by the processor cause the system to execute a method comprising:
inputting an input point cloud to a learning model, wherein the input point cloud includes a plurality of input points, the learning model is trained using learning data, the learning data includes a learning input point cloud and a teacher point cloud, the learning input point cloud includes a set of sparse three-dimensional points representing a part of a shape of an object, and the teacher point cloud completes an output shape based on the learning input point cloud;
determining, based on the input point cloud, a class identification feature of a class associated with the object; and
generating, based on the input point cloud and the class identification feature, a shape completion point cloud,
wherein the generating the shape completion point cloud further comprises:
determining a combination of parameters including a parameter associated with the generating the shape completion point cloud and a parameter associated with determining whether the set of sparse three-dimensional points is a true point cloud, wherein the determining the combination of parameters further comprises optimizing a loss function, and the loss function is based at least on:
a determination result from the determining whether a set of three-dimensional points that includes the input point cloud and the teacher point cloud are combined is a true point cloud,
a determination result from the determining whether a set of three-dimensional points that includes the input point cloud and the shape completion point cloud is a true point cloud, and
a distance between the shape completion point cloud generated by the generator and the teacher point cloud, and
wherein the shape completion point cloud includes the set of three-dimensional points, wherein the generating the shape completion point cloud further includes obtaining an integration result, and wherein the integration result is obtained by steps including:
determining, based on local features associated with respective points of the input cloud point, a global feature associated with the input point cloud,
integrating the global feature with the class identification feature, and
convoluting the integration result to determine a missing portion of the object and to generate the shape completion point cloud associated with the input point cloud.

13. The system according to claim 12, wherein the identifying the class of the object uses a first network, and wherein the generating the shape completion point cloud uses a second network, and wherein the first network and the second network are distinct.

14. The system according to claim 12, the computer-executable program instructions when executed further cause the system to:
receive, by a receiver, sensor data from one or more sensors, wherein the sensor data includes a cloud point as measured data.

15. The system according to claim 12, wherein the one or more sensors include one or more of RGB-D camera or a laser sensor.

16. The system according to claim 12, wherein the loss function includes a stable matching based on Gale-Shapley.

17. The system according to claim 12, wherein the distance between the shape completion point cloud and the teacher point cloud includes a sum of distances between points of the shape completion point cloud and points of the teacher point cloud that correspond to each other, the sum being determined using a result of point association between the input point cloud and the teacher point cloud.

* * * * *